(12) United States Patent
Hall et al.

(10) Patent No.: US 9,715,532 B1
(45) Date of Patent: Jul. 25, 2017

(54) SYSTEMS AND METHODS FOR CONTENT OBJECT OPTIMIZATION

(71) Applicant: Tinder, Inc., West Hollywood, CA (US)

(72) Inventors: Michael Hall, Los Angeles, CA (US); Drew Glicker, Los Angeles, CA (US); Cormac O'Connor, Los Angeles, CA (US); Michael Viamari, Santa Monica, CA (US); Renhui Zhang, Palo Alto, CA (US)

(73) Assignee: Tinder, Inc., West Hollywood, CA (US)

( * ) Notice: Subject to any disclaimer, the term of this patent is extended or adjusted under 35 U.S.C. 154(b) by 0 days.

(21) Appl. No.: 15/289,885

(22) Filed: Oct. 10, 2016

(51) Int. Cl.
*G06F 17/30* (2006.01)

(52) U.S. Cl.
CPC .... *G06F 17/3053* (2013.01); *G06F 17/30554* (2013.01); *G06F 17/30867* (2013.01)

(58) Field of Classification Search
CPC .................................................. G06F 17/30268
USPC .................. 707/706, 748, 723, 733; 715/745
See application file for complete search history.

(56) References Cited

U.S. PATENT DOCUMENTS

| | | | |
|---|---|---|---|
| 8,396,876 B2 * | 3/2013 | Kennedy ........... | G06F 17/30038 706/45 |
| 2009/0210368 A1 * | 8/2009 | Deo ..................... | G06K 9/6267 706/20 |
| 2010/0313140 A1 * | 12/2010 | Bank ................. | G06F 17/30702 715/747 |

* cited by examiner

*Primary Examiner* — Baoquoc N To

(57) ABSTRACT

The present disclosure provides a method for content object optimization. The method includes selecting an object user; obtaining content objects; determining a ranking of the content objects; determining a rotation value; presenting the content objects based on the ranking and rotation value; obtaining feedback associated with the content objects, the feedback obtained at least partially from one or more remote user systems over a communication network; determining empirical scores for the content objects; obtaining behavioral data of an observer user; determining behavioral scores for at least one of the content objects based on the behavioral data; determining a composite score for the at least one of the content objects based on empirical and behavioral scores; updating the ranking based on the composite score(s); presenting at least one of the content objects to the observer user based on the updated ranking.

29 Claims, 8 Drawing Sheets

SYSTEMS AND METHODS FOR CONTENT OBJECT OPTIMIZATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Technical Field

The present disclosure relates generally to the technical field of presenting content objects, and in particular to content object optimization.

Description of Related Art

Social network sites may provide effective platforms for connecting users both online and in real life. For example, users may view profiles of other users, and they may connect with users having similar interests. However, connecting users may depend on the quality of the user profiles and photographs. For example, two users may have similar interests, but if their profiles or photographs are of low quality, a connection may never be made.

SUMMARY

One aspect of the present disclosure is directed to a system for content objection optimization. In some embodiments, the system may include one or more processors and memory, the memory storing computer-executable instructions that, when executed, cause the one or more processors to perform a method comprising selecting an object user; obtaining content objects associated with the object user; determining a ranking of the content objects; determining a rotation value; presenting the content objects based on the ranking of the content objects and the rotation value; obtaining user feedback associated with the presented content objects, the user feedback comprising one or more graphical user interface (GUI) inputs; and determining an empirical content object score for each of the content objects based on the user feedback. In some embodiments, the method may further include obtaining behavioral data of an observer user, the observer user being a presentation target of the presented content objects; determining a behavioral score for each of at least one content object of the content objects based on the behavioral data; determining a composite score for each of the at least one content object of the content objects, each composite score determined based on the empirical score and the behavioral score associated with a corresponding content object of the at least one content object of the content objects; updating the ranking of the content objects based on the one or more composite scores; and presenting at least one of the content objects to the observer user based on the updated ranking.

The content objects may include photographs, videos, etc. The object user can be a registered user of a social site. The presenting the content objects based on the ranking of the content objects and the rotation value may comprise presenting a first content object at a first rate based on the rotation value and presenting the remaining content objects at a second rate based on the rotation value. In related embodiments, the first rate equals to one minus the second rate.

The behavioral data may comprise historical user feedback patterns of the observer user. The updating the ranking of the content objects based on the composite score may be performed in response to an acceptance by the object user of the updated ranking. In some other embodiments, the updating the ranking of the content objects based on the composite score may be performed without requiring user input from the object user.

Another aspect of the present disclosure is directed to a method for content objection optimization. In various embodiments, the method may include selecting, by a server system, an object user; obtaining, by the server system, content objects associated with the object user; determining, by the server system, a ranking of the content objects; determining a rotation value; presenting, by the server system, the content objects based on the ranking of the content objects and the rotation value; obtaining, by the server system, user feedback associated with the presented content objects, the user feedback comprising one or more graphical user interface (GUI) inputs, the user feedback obtained at least partially from one or more remote user systems over a communication network; and determining, by the server system, an empirical content object score for each of the content objects based on the user feedback. In some embodiments, the method may further include obtaining, by the server system, behavioral data of an observer user, the observer user being a presentation target of the presented content objects; determining, by the server system, a behavioral score for each of at least one content object of the content objects based on the behavioral data; determining, by the server system, a composite score for each of the at least one content object of the content objects, each composite score determined based on the empirical score and the behavioral score associated with a corresponding content object of the at least one content object of the content objects; updating, by the server system, the ranking of the content objects based on the one or more composite scores; and presenting, by the server system, at least one of the content objects to the observer user based on the updated ranking.

The content objects may comprise photographs, videos, text, etc. The content objects may be obtained from a remote third-party content object datastore. The presenting the content objects based on the ranking of the content objects and the rotation value may comprise presenting a first content object at a first rate based on the rotation value and presenting the remaining content object at a second rate based on the rotation value. In related embodiments, the first rate equals to one minus the second rate. The behavioral data may comprise historical user feedback patterns of the observer user. The updating the ranking of the content objects based on the composite score may be performed in response to an acceptance by the object user of the updated ranking. In some embodiments, the updating the ranking of the content objects based on the composite score may be performed without requiring user input from the object user.

According to some other embodiments, a system for content object optimization may include one or more processors and memory, the memory storing computer-executable instructions that, when executed, cause the one or more processors to perform a method comprising selecting an object user; obtaining content objects associated with the object user; determining a ranking of the content objects; determining a rotation value; presenting the content objects based on the ranking of the content objects and the rotation value; obtaining user feedback associated with the presented content objects, the user feedback comprising one or more graphical user interface (GUI) inputs; determining a content object score for each of the content objects based on the user feedback; updating the ranking of the content objects based on the one or more content object scores; and presenting the content objects based on the updated ranking and the rotation value.

In some embodiments, the system further comprises instructions that, when executed, cause the one or more processors to perform the method further comprising obtaining behavioral data of an observer user, the observer user being a presentation target of the presented content objects; determining a behavioral score for each of at least one content object of the content objects based on the behavioral data; adjusting the one or more content object score based on the one or more behavioral scores; updating the ranking of the content objects based on the adjusted one or more content object scores; and presenting at least one of the content objects based on the updated ranking and the rotation value.

The content objects may include photographs, videos, etc. The presenting the content objects based on the ranking of the content objects and the rotation value may include presenting a first content object at a first rate based on the rotation value and presenting the remaining content object at a second rate based on the rotation value. In some embodiments, the first rate equals to one minus the second rate. In some embodiments, the behavioral data comprises historical user feedback patterns of the observer user.

In some embodiments, the system further comprises instructions that, when executed, cause the one or more processors to perform the method further comprising adjusting the rotation value based on the updated ranking. The adjusting the rotation value may include increasing the first rate.

The present disclosure further provides a method including selecting, by a server system, an object user; obtaining, by the server system, content objects associated with the object user; determining, by the server system, a ranking of the content objects; determining, by the server system, a rotation value; presenting, by the server system, the content objects based on the ranking of the content objects and the rotation value; obtaining, by the server system, user feedback associated with the presented content objects, the user feedback comprising one or more graphical user interface (GUI) inputs, the user feedback obtained at least partially from one or more remote user systems over a communication network; determining, by the server system, a content object score for each of the content objects based on the user feedback; updating the ranking of the content objects based on the one or more content object scores; and presenting the content objects based on the updated ranking and the rotation value.

In some embodiments, the method further comprises obtaining, by the server system, behavioral data of an observer user, the observer user being associated with one or more remote user systems in communication with the server system over a communication network; determining, by the server system, a behavioral score for each of at least one content object of the content objects based on the behavioral data; adjusting, by the server system, the one or more content object score based on the one or more behavioral scores; updating, by the server system, the ranking of the content objects based on the adjusted one or more content object scores; and presenting, by the server system, the content objects based on the updated ranking and the rotation value.

The present disclosure further provides a content object optimization method including obtaining behavioral data of an observer user, the observer user being a presentation target of the presented content objects; associating one or more tags with the observer user based on the behavioral data; selecting an object user; obtaining one or more content objects associated with the object user; determining a behavioral score for each of at least one content object of the one or more content objects based on the behavioral data; ranking of the one or more content objects based on the one or more behavioral scores; and presenting at least a portion of the one or more content objects based on the ranking.

DETAILED DESCRIPTION

Figure 1:
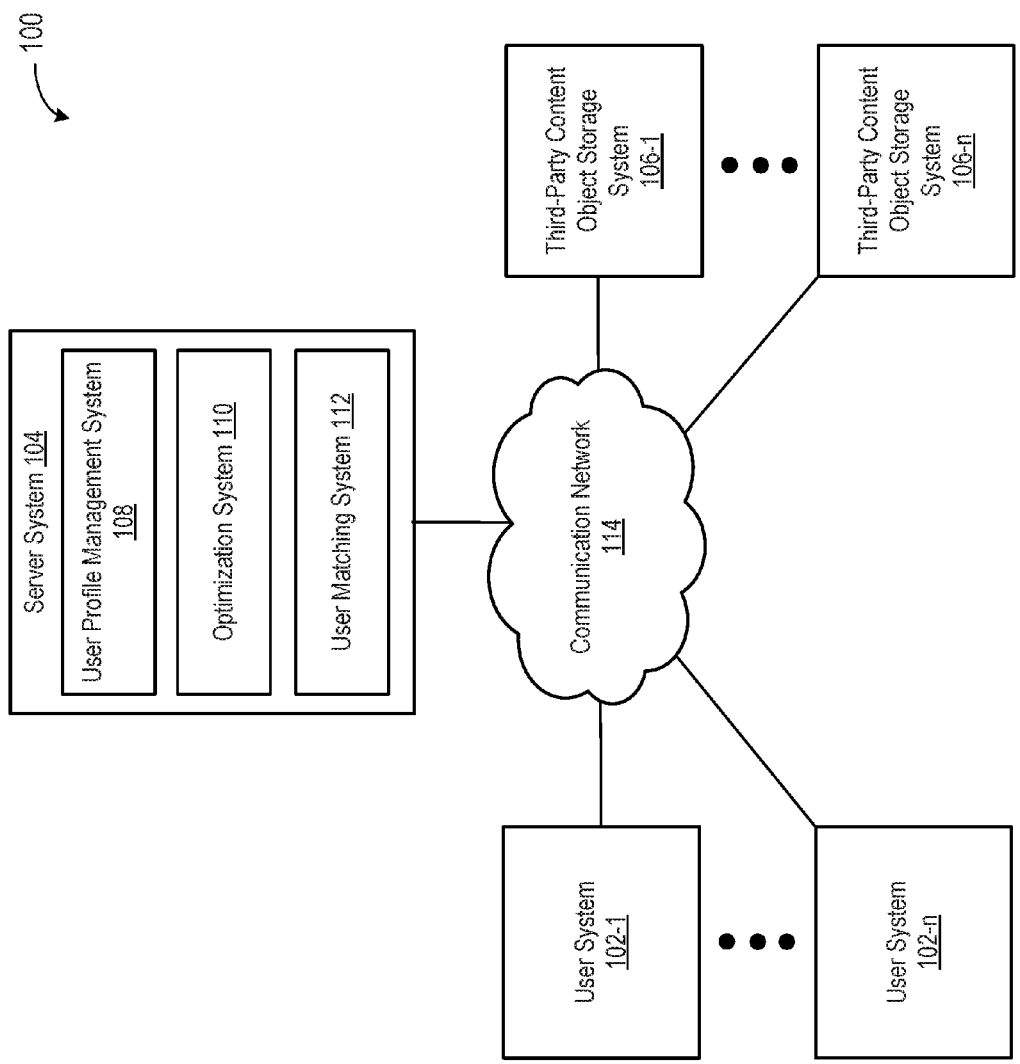
FIG. 1 depicts a diagram of an example of a system capable of providing content object optimization according to some embodiments.

FIG. 1 depicts a diagram of an example of a system 100 capable of providing content object optimization according to some embodiments. The system 100 includes user systems 102-1 to 102-n (individually, the user system 102, collectively, the user systems 102), a server system 104, third-party content object storage systems 106-1 to 106-n (individually, the third-party content object storage system 106, collectively, the third-party content object storage systems 106), and a communication network 114. Some of the components may be optional, for example, the third-party content object storage systems 106.

The user systems 102 may be configured to present user profiles and content objects, receive and provide user feedback regarding user profiles and content objects, and otherwise interface with the system 100. For example, the user systems 102 may include a user interface, e.g., a graphical user interface (GUI), for presenting user profiles and content objects, and receiving user feedback (or, "input"). In some embodiments, functionality of the user systems 102 may be performed by one or more mobile devices, laptop computers, desktop computers, or other computing devices.

As used in this paper, a content object may be an object that includes content from any kind of electronic media, including photographs, video, audio, text, and the like. It will be appreciated that as used herein, content objects may refer to actual content objects (e.g., JPG file, GIF file, MPEG file, MOV file, MP3 file, and the like), and/or pointers or links to the actual content objects. For example, in some embodiments, it may be preferable to process pointers or links in order to improve performance and reduce storage requirements.

In some embodiments, the user systems 102 allow users to view user profiles and content objects of other users. For example, a user profile may be a profile of a user of a network (e.g., a social network site), and the content objects may be photographs of the user. As used herein, a user that views another user's profile may be referred to as an "observer" user, and the user associated with the viewed profile and viewed content objects may be referred to as an "object" user. It will be appreciated that users may operate as observer users and/or object users depending on context.

In some embodiments, user feedback may be a sequence of inputs, such as button presses, button holds, graphical user interface (GUI) selections, gestures (e.g., taps, holds, swipes, pinches, etc.), and the like. It will be appreciated that a sequence may include a sequence of one (e.g., a single gesture). User feedback may be associated with the user profile and/or content object(s) prompting the user feedback. For example, if an observer user "right-swipes" or "left-swipes" a particular content object of an object user on a touch screen (i.e., swipe right on the touch screen or swipe left on the touch screen), the user feedback may be associated with the corresponding user profile and/or content object.

In some embodiments, sequences of inputs may be associated with a type of feedback action. For example, types of feedback actions may include positive feedback actions, negative feedback actions, and so forth. In some embodiments, feedback actions, or types of feedback actions, may be associated with a value (e.g., numerical value, vector value, etc.). For example, a right-swipe input may be associated with a positive feedback action, and a left-swipe input may be associated with a negative feedback action. An example feedback action numerical value may include "+1" for positive feedback actions, and "0" or "−1" for negative feedback actions, although it will be appreciated that different types of positive feedback actions may be associated with different values, and different types of negative feedback actions may be associated with different values. An example feedback action vector value may include the numerical value and one more additional values, e.g., the observer user providing the user feedback, a target content object (e.g., the content object associated with the user feedback), a target object user profile (e.g., the object user profile associated with the user feedback), and the like.

The server system 104 may be configured to store and manage user profiles, optimize content objects, and match different user profiles. For example, functionality of the server system 104 may be performed by one or more workstations, desktop computers, laptop computers, mobile devices, or other computer devices, albeit as adapted according to the teachings herein. In some embodiments, the server system 104 includes a user profile management system 108, an optimization system 110, and a user matching system 112.

The user profile management system 108 may be configured to register users, generate and update user profiles, and maintain a repository of user profiles and associated content objects.

The optimization system 110 may be configured to determine content objects to present to observer users. For illustrative clarity, it will be appreciated that references to a content object may also include a sequence of content objects instead of, or in addition to, a single content object. In some embodiments, an object user may be associated with any number of content objects. The optimization system 110 may present different content objects to different observer users, obtain user feedback associated with the presented content objects, and score the content objects based on the user feedback. For example, a score of a content object may be determined based on a rate that observer users perform positive feedback actions and/or negative feedback actions with respect to the content object. Over time, the content objects may be progressively ranked based on the scores.

In some embodiments, the optimization system 110 may be configured to predict a content object that may have an increased probability of receiving positive feedback actions from an observer user. For example, the optimization system 110 may analyze behavioral data of observer users to facilitate the prediction. In some embodiments, behavioral data may include the types of content objects that resulted in positive user feedback, the types of content objects that resulted in negative user feedback, and so forth.

The user matching system 112 may be configured to determine whether an object user matches an observer user profile. If a match is confirmed, the profile matching system 112 may notify the observer user and the object user of the match. In some embodiments, the user matching system 112 may determine a match based on corresponding user feedback of observer users and object users. For example, if an observer user right-swipes a content object of an object user, and the object user right-swipes a content object of the observer user, the profile matching system 112 may determine a match between the observer user and the object user.

The third-party content object storage systems 106 may be configured to store content objects. For example, the third-party content object storage systems 106 may be storage systems of third-party social media sites or platforms, such as Facebook, Instagram, Pinterest, Snapchat, Twitter, Spotify, and the like.

The communication network 114 may represent one or more computer networks (e.g., LAN, WAN, or the like). The communication network 114 may provide communication between any of the user systems 102, the server system 104, the third-party content object storage systems 106, the user profile management system 108, the optimization system 110, and the user matching system 112. In some embodiments, the communication network 114 comprises one or more computing devices, routers, cables, buses, and/or other network topologies. In some embodiments, the communication network 114 may be wired and/or wireless. In various embodiments, the communication network 114 may comprise the Internet, one or more networks that may be public, private, IP-based, non-IP based, and so forth.

Figure 2:
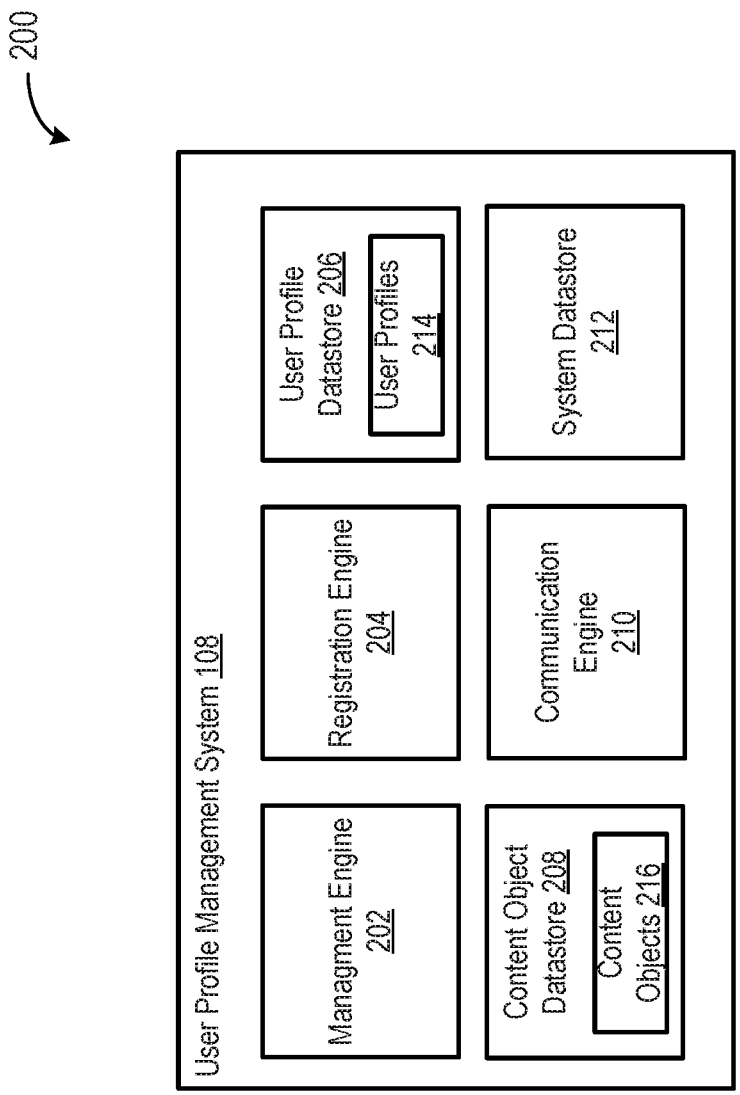
FIG. 2 depicts a diagram of an example of a user profile management system according to some embodiments.

FIG. 2 depicts a diagram 200 of an example of a user profile management system 108 according to some embodiments. In some embodiments, the user profile management system 108 includes a management engine 202, a registration engine 204, a user profile datastore 206, a content object datastore 208, a communication engine 210, and a system datastore 212.

The management engine 202 may be configured to manage (e.g., create, read, update, delete, or otherwise access) user profiles 214 stored in the user profile datastore 206, and content objects 216 stored in the content object datastore 208. The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

The registration engine 204 may be configured to create accounts for users, and/or update account information of users. For example, the accounts may include account credentials (e.g., account username and password), user profile information, and the like. In some embodiments, registration may be required in order to access various features. For example, registration may be required for a user to provide user feedback, match with other users, and so forth. In some embodiments, registration may not be required for some features. For example, prior to registration, a user may be able to view other user profiles, but be unable to provide user feedback.

The user profile datastore 206 may be configured to store user profiles 214. In some embodiments, the user profiles 214 may store user demographic attributes, geographic attributes, psychographic attributes, and the like. For example, user profiles 214 may store some or all of the following attributes:

Profile Identifier: identifies the user profile.
Name: name of the user.
Gender: gender of the user.
Age: age of the user.
Geographic Location: current and/or historical geographic locations of the user and/or associated user systems 102.
School: one or more schools attended by the user.
Class year: graduating class year of the user.
Employer: one or more current and/or or historical employers of the user.
Music: one or more music pieces associated with the user. Any form of music can be used. For example, songs may be linked from one or more third-party entities (e.g., Spotify). In some embodiments, one or more of the songs may be played when an observer user views the user's profile.
User Feedback History: historical user feedback provided by the user. For example, the feedback actions (e.g., right-swipe, left-swipe, etc.) and/or type of feedback actions (e.g., positive feedback action, negative feedback action, etc.) performed and the content objects and/or object user profiles associated with those feedback actions.
Tags: one or more tags associated with the user. Tags are discussed further below with reference to FIGS. 3-7.
Profile Description: description of the user.
Matches: current and/or historical user matches.
Communication Information: current and/or historical communications between the user and one or more other users.

The content object datastore 208 may be configured to store content objects 216. In some embodiments, content objects 216 may store electronic content (e.g., the image file), geographic attributes, psychographic attributes, and/or the like. For example, content objects may store some or all of the following attributes:

Content Object Identifier: identifies the content object.
Content: the electronic media content (e.g., JPG file).
User Profile: the user profile associated with the content object.
Date: date and/or time the content object was associated with the content object user (e.g., when the content object was uploaded).
Feedback History: historical user feedback associated with the content object. For example, the feedback actions (e.g., right-swipe, left-swipe, etc.) and/or type of feedback actions (e.g., positive feedback action, negative feedback action, etc.) associated with the content object.
Empirical Scores: current and/or historical empirical scores associated with the content object. Empirical scores are discussed further below with reference to FIGS. 3-7.
Behavioral Scores: current and/or historical behavioral scores associated with the content object. Behavioral scores are discussed further below with reference to FIGS. 3-7.

In some embodiments, the content objects 216 may comprise content object vectors. For example, a content object vector may include the content and one or more additional content object attributes. In some embodiments, one or more of the content object attributes may be weighted. For example, the content object date attribute may be weighted heavily if the date is relatively recent, and the weight may be reduced over time. It will be appreciated that as used herein, content objects 216 may refer to content objects and/or content object vectors.

In some embodiments, the content objects 216 and/or content object vectors may comprise one or more attributes of an associated user profile 214. This can, for example, help determine which user profile attributes (e.g., school, graduation year, song, places traveled, the last place traveled, and the like) of an object user to present to an observer user.

The communication engine 210 may be configured to send requests, transmit and, receive communications, and/or otherwise provide communication with one or a plurality of systems. In some embodiments, the communication engine 210 may be configured to encrypt and decrypt communications. The communication engine 210 may send requests to and receive data from a system through a network or a portion of a network. Depending upon implementation-specific or other considerations, the communication engine 210 may send requests and receive data through a connection, all or a portion of which may be a wireless connection. The communication engine 210 may request and receive messages, and/or other communications from associated systems. In some embodiments, the communication engine 210 may send and receive content objects 216. For example, the communication engine 210 may receive content objects 216 from one or more remote third-party content object storage systems, provide content objects 216 to associated systems, and so forth. Received communications may be stored at least temporarily in the system datastore 212.

Figure 3:
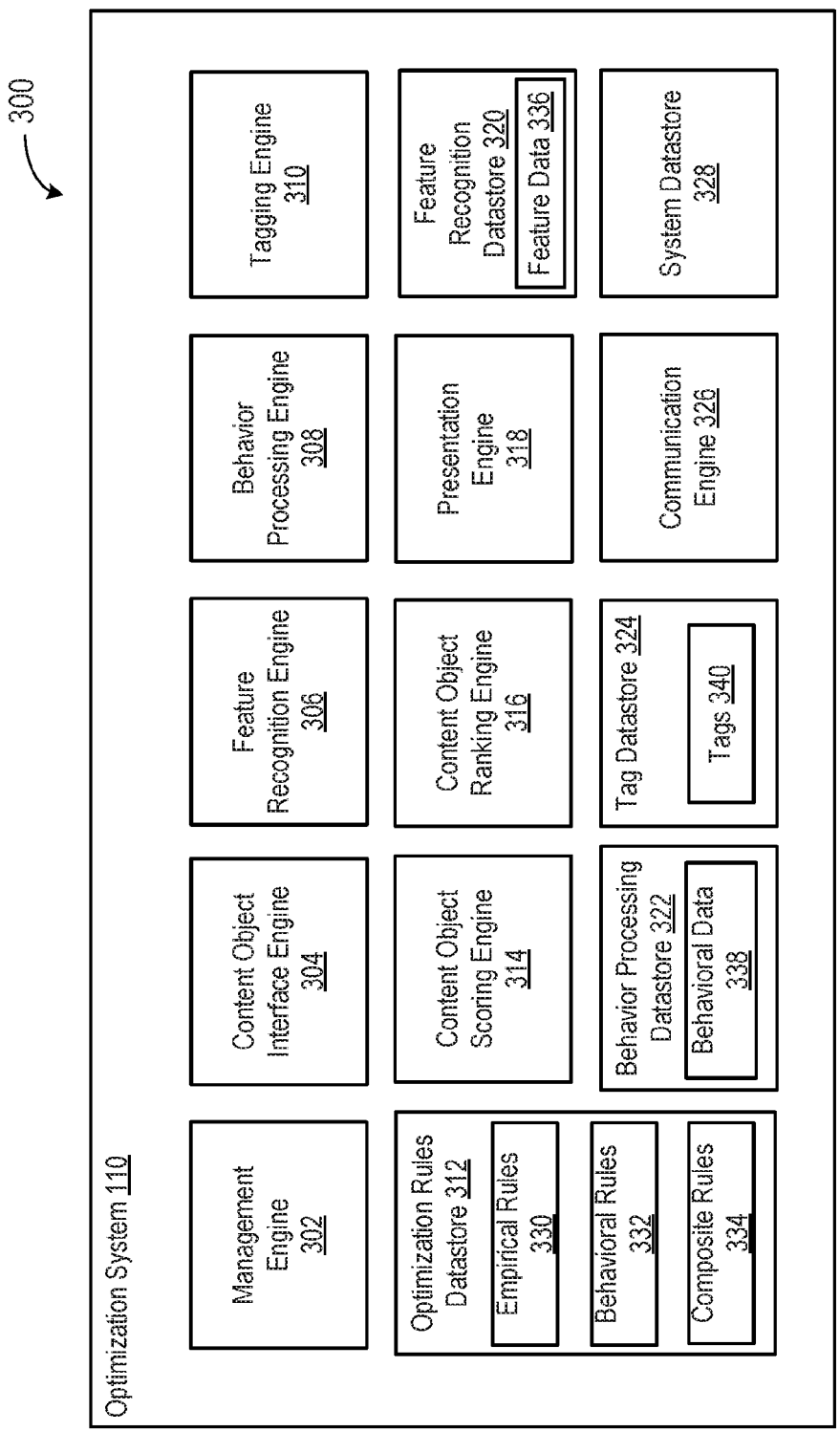
FIG. 3 depicts a diagram of an example of an optimization system according to some embodiments.

FIG. 3 depicts a diagram 300 of an example of an optimization system 110 according to some embodiments. In some embodiments, the optimization system 110 includes a management engine 302, a content object interface engine 304, a feature recognition engine 306, a behavior processing engine 308, a tagging engine 310, an optimization rules datastore 312, a content object scoring engine 314, a content object ranking engine 316, a presentation engine 318, a feature recognition datastore 320, a behavior processing datastore 322, a tag datastore 324, a communication engine 326, and a system datastore 328.

The management engine 302 may be configured to manage (e.g., create, read, update, delete, or otherwise access) optimization rules 330-334 stored in the optimization rules datastore 312, feature data 336 stored in the feature recognition datastore 320, behavioral data 338 stored in the behavior processing datastore 322, and tags 340 stored in the tag datastore 324.

The content object interface engine 304 may be configured to interface with one or more systems to send and/or receive content objects 216. In some embodiments, the content object interface engine 304 may send and/or receive content objects 216 from one or more systems controlled by the entity controlling the optimization system 110, and/or from one or more systems controlled by third-party entities. For example, the content object interface engine 304 may receive content objects 216 from the user profile management system 108 and/or from one or more of the third-party content object storage systems 106.

The feature recognition engine 306 may be configured to identify one or more features 336 represented within a content object 216. In some embodiments, the feature recognition engine 306 may perform a variety of image analyses, audio analyses, motion capture analysis, and natural language processing analyses, to identify one or more features 336. For example, the feature recognition engine 306 may identify subjects (e.g., animals, persons, events, groups of persons, objects, signs, etc.), a particular person (e.g., the associated object user or other individuals), voices, buildings, landmarks, and/or geographic features represented within the content object 216. In some embodiments, the feature recognition engine 306 may identify quality characteristic features 336 (e.g., image resolution, image contrast ratio, image color levels, compression levels, etc.) of the content object 216.

In some embodiments, the feature recognition engine 306 may be configured to identify features 336 in real-time and/or offline (e.g., batch-mode processing). For example, features 336 may be recognized in response to the server 104 receiving a request to present content objects 216 to an observer user (e.g., real-time), and/or based on trigger events (e.g., predetermined intervals, manual trigger of a batch process by an administrator, etc.).

The behavior processing engine 308 may be configured to receive and process user feedback, and generate behavioral data 338 based on user feedback. In some embodiments, behavioral data 338 may include user profile attribute data and/or user feedback patterns with respect to particular types of content objects. A content object type may be determined based on one or more features 336 of the content object 216. In some embodiments, the behavioral data 338 may include the rate or number of times observer users performed positive feedback actions (e.g., a right-swipes) with respect to content objects including one or more particular features 336, and/or the rate or number of times observer users performed negative feedback actions (e.g., a left-swipes) with respect to content objects including one or more particular features 336.

The tagging engine 310 may be configured to create, update, and delete tags 340, and associate tags 340 with user profiles 214. In some embodiments, tags 340 may be associated with user profiles 214 based on associated behavioral data 338. In some embodiments, a tag 340 may indicate that a threshold percentage or rate of a user's feedback actions with respect to a particular type of content object are positive feedback actions. For example, an "animal" tag 340 may be associated with a user profile if 60% of the user's feedback actions associated with content objects 216 including an animal are positive feedback actions. Other exemplary thresholds may be based on a total number of positive feedback actions performed with respect to a particular type of content object, a total number of negative feedback actions performed with respect to a particular type of content object, a percentage or rate at which the observer user performs negative feedback actions with respect to a particular type of content object, and so forth.

The optimization rules datastore 312 may be configured to store empirical optimization rules 330, behavioral optimization rules 332, and composite optimization rules 334. The optimization rules 330-334 may define functions and attributes for scoring and/or ranking content objects. Example scoring and ranking methods based on the empirical optimization rules 332 are shown and described with reference to FIGS. 4 and 5. An example scoring and ranking method based on the behavioral optimization rules 334 is shown and described with reference to FIG. 6. An example scoring and ranking method based on the composite optimization rules 336 is shown and described with reference to FIG. 7.

The content object scoring engine 314 may be configured to determine empirical and behavioral scores for content objects 216. In some embodiments, the content object scoring engine 314 determines empirical scores based on the empirical optimization rules 332, behavioral scores based on the behavioral optimization rules 334, and composite scores based on the composite rules 336.

The content object ranking engine 316 may be configured to determine a ranking of content objects 216. In some embodiments, rankings may be determined based on empirical scores, behavioral scores, and/or composite scores associated with content objects 216. In some embodiments, rankings may be determined based on the optimization rules 330-334.

The presentation engine 318 may be configured to select and present content objects 216. In some embodiments, the presentation engine 318 may select content objects 216 based on associated scores and/or rankings, and a rotation value. For example, for a plurality of content objects 216 associated with an object user, the presentation engine 318 may select and present the "best" content object 216 (e.g., the content object at a first position in the ranking) at a particular rate based on the rotation value (e.g., 20% of the time), and the presentation engine 318 may select and present the remaining content objects 216 at a particular rate based on the rotation value (e.g., 80% percent of the time).

In some embodiments, the presentation engine 318 may be configured to select and present user profiles. For example, object user profiles may be selected for presentation to an observer user based on a location of the observer user, any tags associated with the observer user's profile, and/or other behavioral data 338 of the observer user.

The feature recognition datastore 320 may be configured to store features 336. The behavior processing datastore 322 may be configured to store behavioral data 338. The tag datastore 324 may be configured to store tags 340.

The communication engine 326 may be configured to send requests, transmit and, receive communications, and/or otherwise provide communication with one or a plurality of systems. In some embodiments, the communication engine 326 may be configured to encrypt and decrypt communications. The communication engine 326 may send requests to and receive data from a system through a network or a portion of a network. Depending upon implementation-specific or other considerations, the communication engine 326 may send requests and receive data through a connection, all or a portion of which may be a wireless connection. The communication engine 326 may request and receive messages, and/or other communications from associated systems. Communications may be stored at least temporarily in the system datastore 328.

Figure 4:
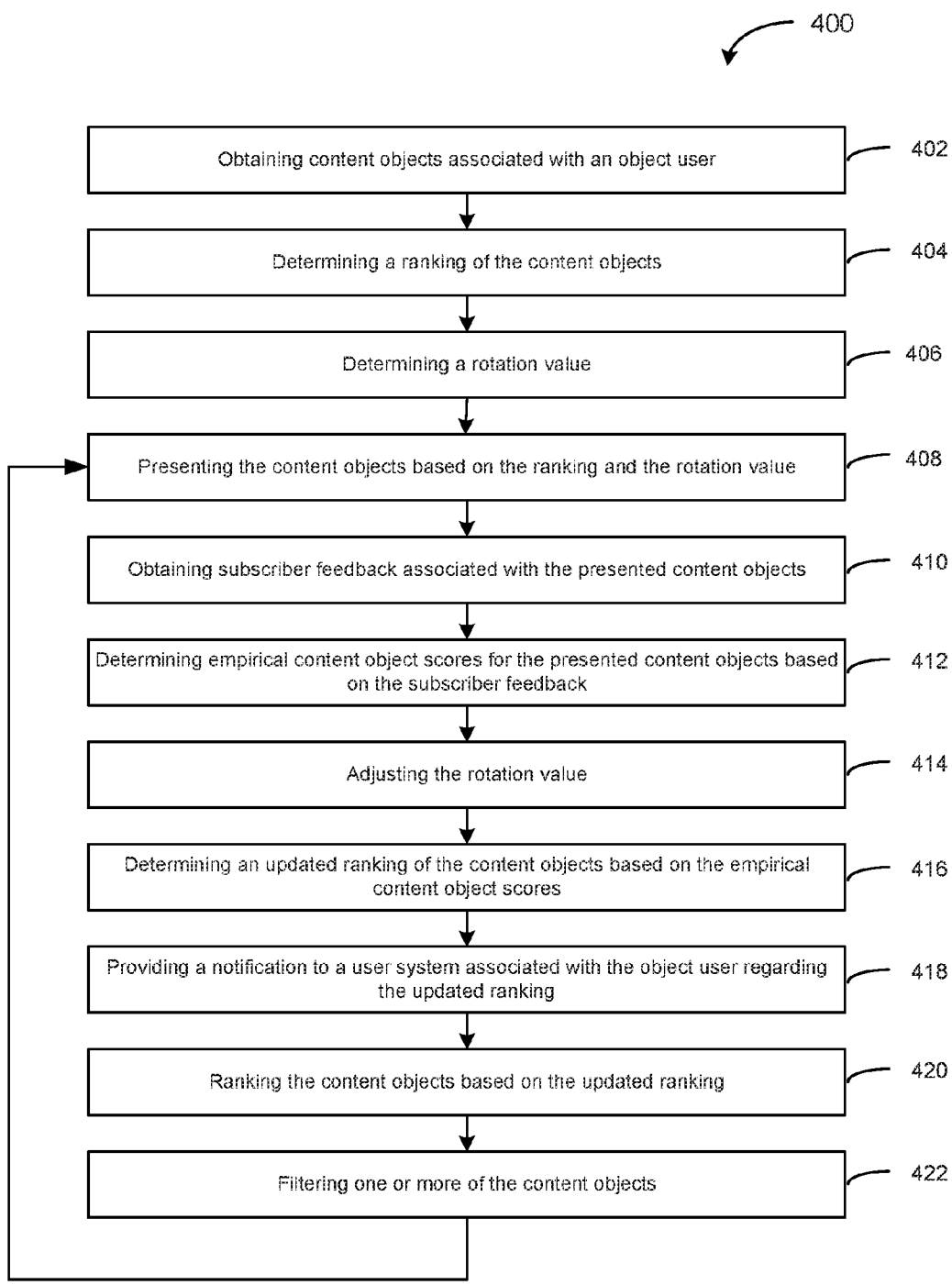
FIG. 4 depicts a flowchart of an example method for empirical content object optimization according to some embodiments.

FIG. 4 depicts a flowchart 400 of an example method for empirical content object optimization according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 402, an optimization system 110 obtains content objects 216 associated with an object user. In some embodiments, the content objects 216 may be obtained from a system controlled by the entity controlling the optimization system 110, and/or from a system controlled by a third-party entity. For example, the content objects 216 may be obtained from a user profile management system 108 and/or from one or more third-party content object storage systems 106. In some embodiments, a content object interface engine 304 obtains the content objects 216 from a content object datastore 208 and/or from the one or more third-party content object storage systems 108.

In some embodiments, the optimization system 110 obtains content objects 216 associated with the object user in response to input from the object user. For example, the content objects 216 may be obtained in response to successful registration of the object user. For example, during registration, the object user may upload content objects 216 to the user profile management system 108, and/or linked third-party accounts (e.g., Facebook accounts, etc.). The optimization system 110 may obtain some or all content objects 216 associated with any linked third-party accounts, as well as some or all of the content objects 216 uploaded by the object user.

In some embodiments, the optimization system 110 automatically (e.g., without requiring user input) obtains a portion of content objects 216 associated with the linked third-party accounts. For example, the optimization system 110 may define conditions for selecting the portion of content objects 216 to obtain. For example, the conditions may define threshold display quality characteristics (e.g., resolution, data size, date, etc.), and only obtain the content objects 216 satisfying the threshold quality conditions.

In some embodiments, the optimization system 110 obtains content objects 216 associated with the object user in response to satisfaction of a trigger condition. For example, a trigger condition may define an offline content object optimization schedule (e.g., every minute, hour, day, week, month, etc.), and the content objects 216 may be obtained according to the schedule.

In some embodiments, the optimization system 110 obtains content objects 216 associated with the object user in response to input from an observer user. For example, the optimization system 110 may obtain the content objects 216 in response to an observer user logging in to their account, updating an attribute of their user profile (e.g., location), providing user feedback (e.g., left-swiping a particular content object 216), and so forth.

In step 404, the optimization system 110 determines a ranking of content objects 216. For example, the ranking may be determined in response to user input (e.g., an associated object user) and/or automatically. For example, an object user may choose a best content object (e.g., best photo). For example, the system 110 may determine a randomized ranking if the content objects 216 are not currently associated with any scores (e.g., empirical and/or behavioral scores), such as randomly picking one content object as a best one, and equally ranking the remaining ones, or equally rank all the content objects 216. In some embodiments, the ranking may define an order or sequence of the content objects 216. In some embodiments, the content objects 216 may be ranked based on a ranking defined in the object user's profile. In some embodiments, a content object ranking engine 316 ranks the content objects 216.

In step 406, the optimization system 110 determines a rotation value. In some embodiments, the rotation value may be constant or variable. If a value is not currently set, a default value may be used. For example, the default value may be 1−(1/N), where N is the number of content objects 216. In some embodiments, a presentation engine 318 determines the rotation value.

In step 408, the optimization system 110 presents the content objects based on the ranking and the rotation value. For example, the content objects 216 may comprise a set of three different content objects 216 associated with the object user, e.g., content object A, content object B, and content object C. The different content objects 216 may be ranked, for example, content object B at a first position (e.g., indicating a "best" content object, or "lead" content object), and both content object A and content object C at a second position. Based on the rotation value, in some embodiments, the optimization system 110 may determine which content object 216 to present. For example, if the rotation value is 20%, that indicates that the content object at the first position (e.g., content object B) should be presented 80% (1-20%) of the time, and the other content objects 216 (e.g., content objects A and C) should be presented the remaining 20% (rotation value) of the time. In this way, the optimization system 110 exploits or makes full use of the "best" content object to maximize rewards, and at the same time, explores other content objects.

In some embodiments, the content objects 216 may all be presented if the associated object user is selected. For example, the content objects 216 may be presented with different sizes, one with a full size, and the others with much smaller size on the same screen. For another example, the content objects 216 may be presented in a sequence if an observer user chooses to scroll through them. The optimization system 110 may also determine the size or sequence to present the content objects 216. For example, it may be determined that 80% of the time content object B is presented with a full size and content objects A and C with smaller sizes, or the sequence should directly reflect the ranking (e.g., present content object B first, and rotate content object A and content object C). In some embodiments, the presentation engine 318 presents the content objects 216.

In step 410, the optimization system 110 obtains user feedback associated with presented content objects 216. For example, user feedback may be observer user input associated with positive actions (e.g., right-swipes) or negative actions (e.g., left-swipes). In some embodiments, a behavior processing engine 308 obtains the user feedback. For example, the behavior processing engine 308 may obtain the user feedback from associated user profiles 214 and/or from associated user systems 102.

In step 412, the optimization system 110 determines empirical content object scores (or, "empirical scores") for the presented content objects 216 based on the user feedback. In some embodiments, different types of user feedback (e.g., positive feedback, negative feedback, etc.) may be associated with different value. For example, positive feedback may associated with a "+1" value, and negative feedback may be associated with a "−1" value. The empirical score for a particular content object 216 may comprise a sum of the feedback values associated with the particular content object 216. Thus, for example, if a particular content object 216 has received 100 right-swipes and 50 left-swipes, the empirical score may have a value of 50. In some embodiments, the empirical score may be a right-swipe rate. For example, in the above example, the empirical score may be 100/(100+50)=2/3. The right-swipe rate is 2/3. In some embodiments, the content object scoring engine 314 may determine the empirical score.

In some embodiments, an empirical score may be based on one or more attributes of an associated content object (e.g., how often the content object has been presented, when the content object was first presented or uploaded, etc.). For example, "newer" content objects 216 may receive a bonus value to their empirical score, and "older" content objects 216 may receive a penalty to their empirical score.

In step 414, the optimization system 110 adjusts the rotation value, for example, by a decay function, to determine a new rotation value. This may help, for example, increase the rate at which the "best" content object is presented, and reduce the rate at which the lower ranked content objects 216 are presented. One exemplary decay function can be gradually increase the rate at which "best" content object is presented, and correspondingly decrease the rate at which the lower ranked content objects 216 are presented. In some embodiments, the rotation value may be adjusted subsequent to the ranking of the content objects based on the updated ranking (step 420).

In embodiments, the optimization system 110 adjusts the value of the rotation value in response to one or more trigger events and/or predetermined schedules. In some embodiments, a trigger event may include associating one or more additional content objects 216 with an object user. For example, if content object D is added to previously associated content objects A, B, and C, the optimization system 110 may adjust (e.g., increase) the rotation value such that the rate at which the lead content object is presented is lowered, and the rate at which the non-lead content objects are presented is increased. In some embodiments, the new content object D may be assigned with a high presentation rate. This may help, for example, ensure that newer content objects receive sufficient user feedback to determine accurate empirical scores. In some embodiments, a trigger event may include removing one or more associated content objects 216. In some embodiments, the optimization system 110 may adjust the value of the rotation value periodically, e.g., at certain time each day.

In step 416, the optimization system 110 determines an updated ranking of content objects 216 based on empirical content object scores. For example, in a schema wherein higher empirical scores indicate a higher rate or number of positive feedback associations, and lower empirical scores indicate a lower rate or number of positive feedback associations, the content objects 216 may be ranked from highest empirical score at the first position to the lowest empirical score at the last position. Similarly, in a schema wherein lower empirical scores indicate a higher rate or number of positive feedback associations, and higher empirical scores indicate a lower rate or number of positive feedback associations, the content objects 216 may be ranked from lowest empirical score at the first position to the highest empirical score at the last position. In some embodiments, the content object ranking engine 316 determines the updated ranking of the content objects 216.

In step 418, the optimization system 110 provides a notification to a user system 102 associated with the object user regarding the updated ranking. For example, the notification may include a message indicating the ranking has changed, and prompt the user to accept the updated ranking. For example, if content object B was previously ranked at the first position, and the updated ranking has content object A at the first position, and content object B at the second position, the notification may request the user changes the lead content object to content object B.

In step 420, the optimization system 110 ranks content objects 216 based on the updated ranking. In some embodiments this may be performed automatically and/or in response to user input. For example, the ranking may be updated without requiring the user to accept the updated ranking, or the ranking may be updated only if the user accepts the change.

In step 422, the optimization system 110 filters one or more of content objects 216. For example, one or more trigger conditions may cause the optimization system 110 to filter one or more of the content objects 216 based on user feedback and/or empirical scores. For example, if a particular content object has an empirical score below a threshold value, thereby indicating poor associated user feedback, the particular content object may be filtered out. In some embodiments, filtered-out content objects may be ignored in subsequent iterations of the method 400.

In various embodiments, any of the steps 402-422 (e.g., steps 408-422) may be repeated any number of times with respect to any number of observer users, e.g., to obtain additional user feedback and provide increasingly accurate scoring and ranking of content objects 216.

Figure 5:
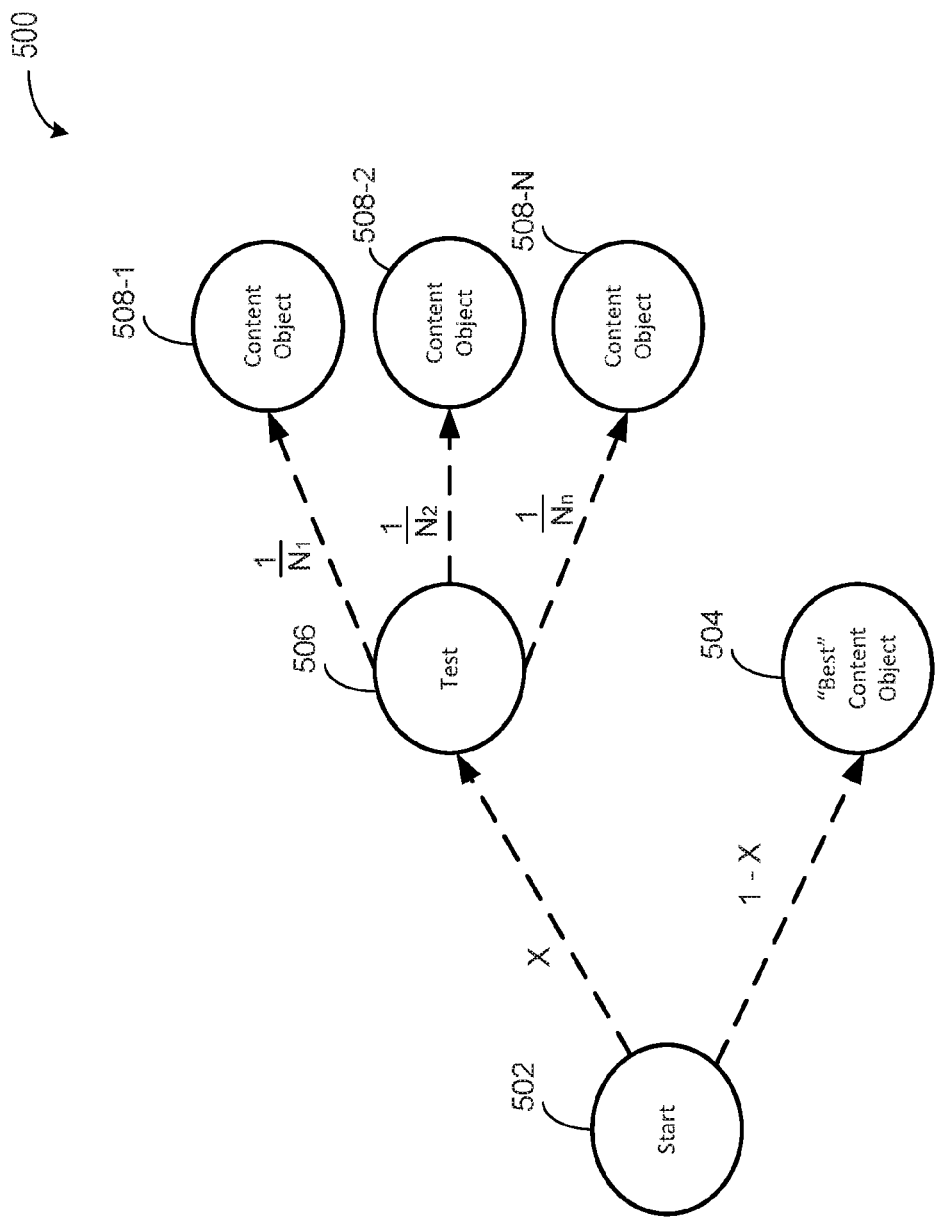
FIG. 5 depicts a node graph representing an example method for empirical content object optimization according to some embodiments.

FIG. 5 depicts a node graph 500 representing an example method for empirical content object optimization according to some embodiments. At node 502, the empirical optimization is initiated with respect to content objects 216 associated with an object user. At node 504, the "best" content object 216, e.g., as indicated by the content object 216 at a first position of an associated ranking, is presented to observer users at a determined rate. In some embodiments, the determined rate may be 1−X, where X is the rotation value. For example, if the rotation value is 0.8, the best content object may be presented 20% of the time. The remaining 80% of the time, the other ranked content objects 216 may be presented, as shown in nodes 506 and 508 (unless they are filtered-out). The other ranked content objects 216 may be presented at different rates, for example, corresponding to their right-swipe rates. For example, the content objects having higher ranks (high "right-swipe" rate) may be presented at a higher rate.

Figure 6:
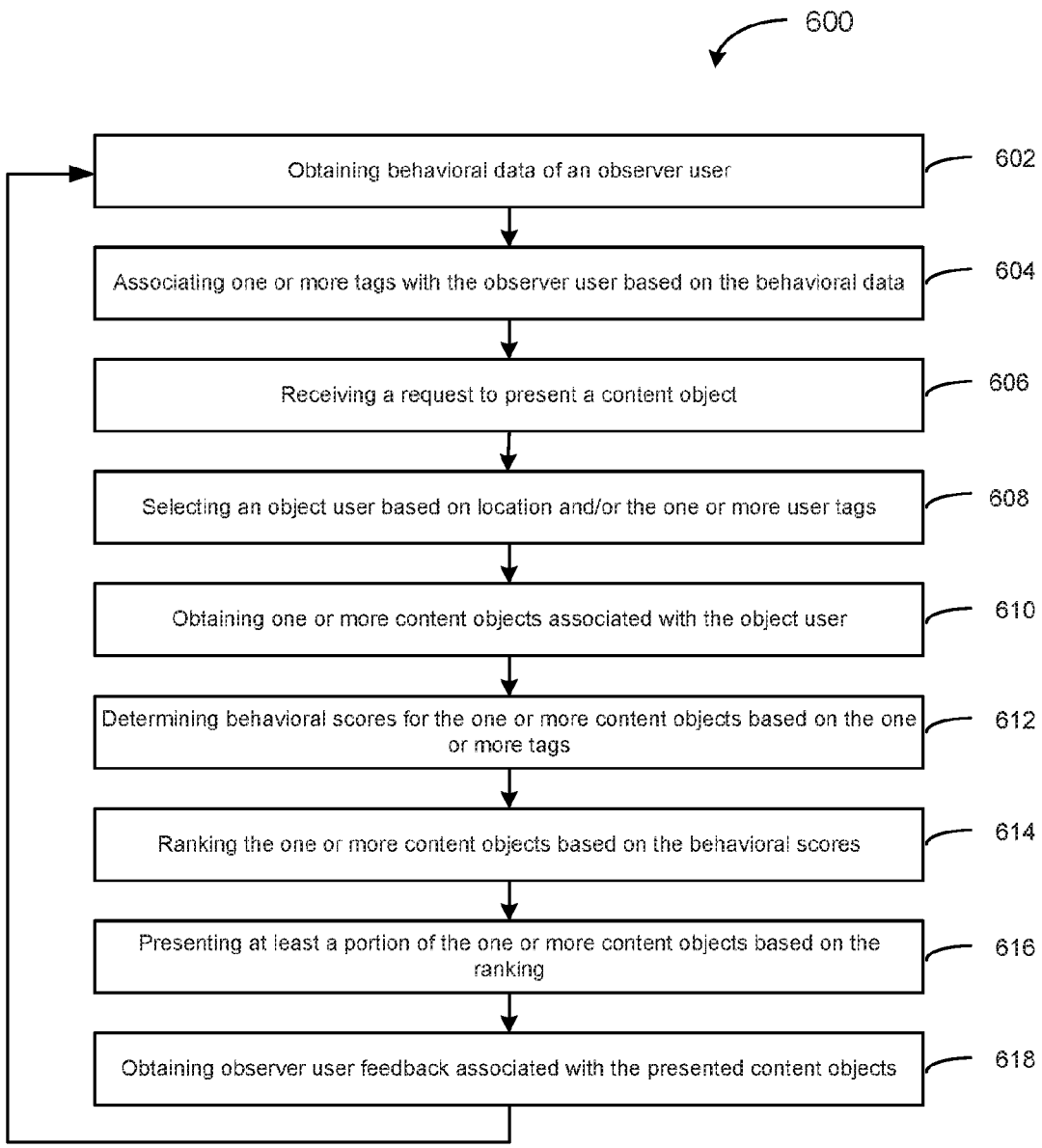
FIG. 6 depicts a flowchart of an example method for behavioral content object optimization according to some embodiments.

FIG. 6 depicts a flowchart 600 of an example method for behavioral content object optimization according to some embodiments.

In step 602, an optimization system 110 obtains behavioral data 338 of an observer user. In some embodiments, behavioral data 338 may include user feedback patterns with respect to particular types of content objects. For example, behavioral data 338 may include the rate or number of times the observer user performed a positive feedback action (e.g., a right-swipe) with respect to content objects including one or more particular features 336, and the rate or number of times the observer user performed a negative feedback action (e.g., a left-swipe) with respect to content objects including one or more particular features 336. In some embodiments, a behavior processing engine 308 obtains the behavioral data 338.

In some embodiments, a feature 336 may be a content feature (e.g., content objects representing images of animals, images of sporting events, etc.). In some embodiments a feature 336 may be a quality feature. For example, quality features may include image qualities (e.g., resolution), audio qualities, and the like.

In step 604, the optimization system 110 associates one or more tags 340 with the observer user based on the behavioral data 338. In some embodiments, a tag 340 may indicate that a threshold percentage or rate of the observer user's feedback actions with respect to a particular type of content object are positive feedback actions. For example, an "animal" tag may be associated with the observer user if 60% of the observer user's feedback actions with respect to the content objects 216 including an animal are positive feedback actions. Other thresholds may include for example, a total number of positive feedback actions performed with respect to a particular type of content object, a total number of negative feedback actions performed with respect to a particular type of content object, a percentage or rate at which the observer user performs negative feedback actions with respect to a particular type of content object, and so forth.

In step 606, the optimization system 110 receives a request to present a content object 216. In some embodiments, the request may be received in response to an action associated with an observer user. For example, the action may be the observer user logging into their account, updating one or more profile attributes (e.g., location), selecting an object user profile and/or content object 216, and so forth. In some embodiments, a presentation engine 318 receives the request to the present the content object 216.

In step 608, the optimization system 110 selects an object user based on location and/or the one or more tags 340 of the observer user. In some embodiments, the object user is selected from a set of target object users within a predetermined radius of a current geographic location of the observer user. In some embodiments, the object user may be selected based on matching tags 340 and content features 336. For example, if the observer user has an "animal" tag (indicating that the observer user has a high right-swipe rate on content objects with an animal in it), the optimization system 110 may select object users with content objects that have animal in them. In some other embodiments, the optimization system 110 may select object users having user profiles associated with one or more tags 340 corresponding to the same or equivalent tags 340 of the observer user's profile. In some embodiments, the presentation engine 318 performs the selection.

In step 610, the optimization system 110 obtains one or more content objects 216 associated with the selected object user. For example, the optimization system 110 may obtain the one or more content objects 216 in response to selection of the object user. In some embodiments, a content object interface engine 304 obtains the one or more content objects 216. It will be appreciated that in some embodiments, if only one content object 216 is obtained, the optimization system 110 may present that content object 216, and the method 400 may terminate or proceed to step 618.

In step 612, the optimization system 110 determines behavioral scores for the one or more content objects 216 based on one or more tags. In some embodiments, each behavioral score comprises a value that may be used to determine a likelihood that the observer user may provide a positive feedback action in response to a corresponding content object 216. For example, if the observer user profile is associated with an "animal" tag 340, content objects 216 including animal features 336 may receive a corresponding behavioral score indicating an increased likelihood of receiving a positive feedback action. In some embodiments, a feature recognition engine 306 may identify features 336 of the content objects 216, and a content object scoring engine 314 may determine the behavioral scores.

In step 614, the optimization system 110 ranks one or more content objects 216 based on the behavioral scores. For example, a first position of the ranking may be associated with the content object 216 having a behavioral score indicating the highest probability of receiving a positive feedback reaction relative to the other content objects 216. The remaining positions of the rankings may each be associated with the remaining content objects 216 in descending or equal order based on their respective behavioral scores. In some embodiments, the content object ranking engine 316 performs the ranking.

In step 616, the optimization system 110 presents at least a portion of the one or more content objects 216 based on the ranking. For example, the optimization system 110 may present the content object 216 associated with the first position of the ranking (i.e., "lead" content object or "best" content object). In some embodiments, the presentation engine 318 performs the presentation.

In step 618, the optimization system 110 obtains user feedback associated with the presented content objects 216. For example, user feedback may be observer user's input associated with positive actions (e.g., right-swipes) or negative actions (e.g., left-swipes). In some embodiments, the behavior processing engine 308 obtains the user feedback.

Figure 7:
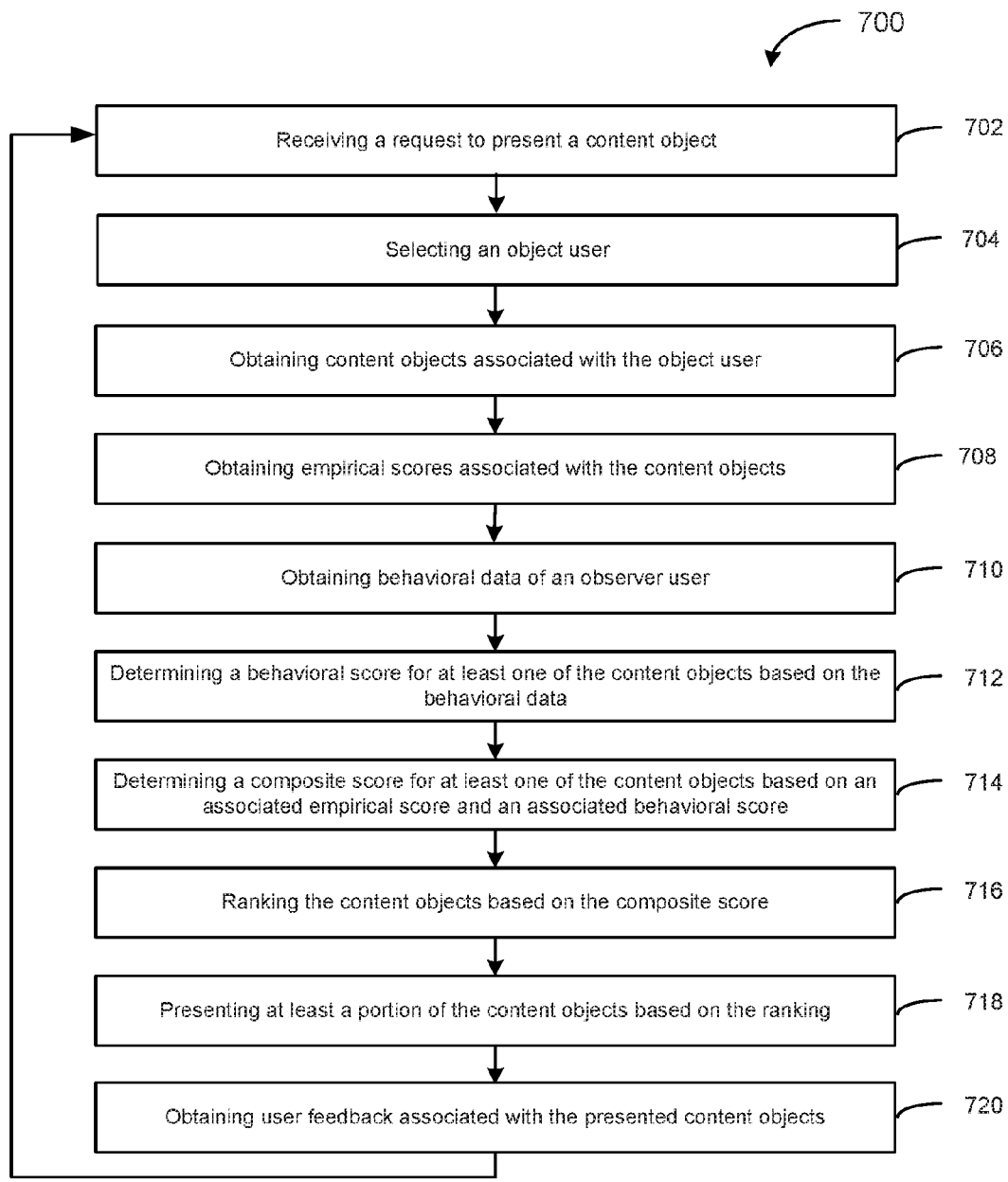
FIG. 7 depicts a flowchart of an example method for composite content object optimization according to some embodiments.

FIG. 7 depicts a flowchart 700 of an example method for composite content object optimization according to some embodiments.

In step 702, the optimization system 110 receives a request to present a content object 216. In some embodiments, this step may be the same, or similar to, step 606.

In step 704, the optimization system 110 selects an object user. In some embodiments, this step may be the same, or similar to, step 608.

In step 706, the optimization system 110 obtains content objects 216 associated with the object user. In some embodiments, this step may be the same, or similar to, step 610.

In step 708, the optimization system 110 obtains empirical scores associated with the content objects 216. In some embodiments, this step may be the same, or similar to, some or all of steps 402-411.

In step 710, the optimization system 110 obtains behavioral data 338 of the observer user. In some embodiments, this step may be the same, or similar to, step 602.

In step 712, the optimization system 110 determines a behavioral score for at least one of the content objects 216 based on the behavioral data 338. In some embodiments, this step may be the same, or similar to, step 612.

In step 714, the optimization system 110 determines a composite score for at least one of the content objects 216 based on an associated empirical score and an associated behavioral score. For example, the composite score may comprise the empirical score adjusted (or, "weighted") based on the behavioral score. By way of further example, the composite score may comprise a sum of the empirical score and the behavioral score. In some embodiments, a content object scoring engine 314 determines the composite score. In some embodiments, one of the empirical score and the behavioral score may be given more weight than the other. For example, the composite score may comprise a sum of the empirical score*1.5 and the behavioral score.

In step 716, the optimization system 110 ranks the content objects 216 based on the composite score. For example, the content object 216 having the best composite score may be associated with a first position of the ranking, and the remaining content objects 216 may be ranked in descending order of composite scores. In some embodiments, a content object ranking engine 316 performs the ranking.

In step 718, the optimization system 110 presents at least a portion of the content objects 216 based on the ranking. In some embodiments, this step may be the same, or similar to, step 616.

In step 720, the optimization system 110 obtains user feedback associated with the presented content objects 216. In some embodiments, this step may be the same, or similar to, step 618.

Figure 8:
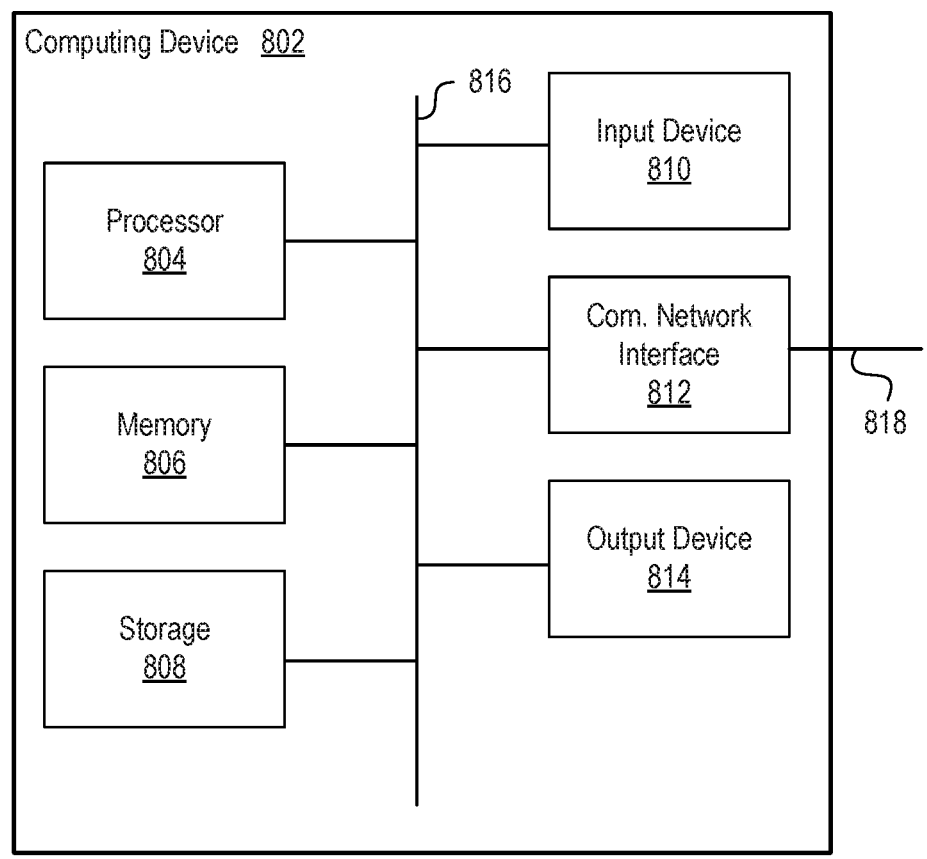
FIG. 8 depicts a diagram of an example computing device that may be configured to perform some or all of the functionalities described herein according to some embodiments.

FIG. 8 depicts a diagram 800 of an example computing device 802 that may be configured to perform some or all of the functionalities described herein according to some embodiments. Any of the user systems 102, the server system 104, the third-party content object storage systems 106, the user profile management system 108, the optimization system 110, the user matching system 112, and the communication network 114 may comprise one or more instances of the computing device 1102, albeit as adapted to perform some or all of the functionalities described herein. The computing device 802 comprises a processor 804, memory 806, storage 808, an input device 810, a communication network interface 812, and an output device 814 communicatively coupled to a communication channel 816. The processor 804 is configured to execute executable instructions (e.g., programs). In some embodiments, the processor 804 comprises circuitry or any processor capable of processing the executable instructions.

The memory 806 stores data. Some examples of memory 806 include storage devices, such as RAM, ROM, RAM cache, virtual memory, etc. In various embodiments, working data is stored within the memory 806. The data within the memory 806 may be cleared or ultimately transferred to the storage 808.

The storage 808 includes any storage configured to retrieve and store data. Some examples of the storage 808 include flash drives, hard drives, optical drives, and/or magnetic tape. Each of the memory system 806 and the storage system 808 comprises a computer-readable medium, which stores instructions or programs executable by processor 804.

The input device 810 is any device that inputs data (e.g., mouse and keyboard). The output device 814 outputs data (e.g., a speaker or display). It will be appreciated that the storage 808, input device 810, and output device 814 may be optional. For example, the routers/switchers may comprise the processor 804 and memory 806 as well as a device to receive and output data (e.g., the communication network interface 812 and/or the output device 814).

The communication network interface 812 may be coupled to a network (e.g., network 80) via the link 818. The communication network interface 812 may support communication over an Ethernet connection, a serial connection, a parallel connection, and/or an ATA connection. The communication network interface 812 may also support wireless communication (e.g., 802.11 a/b/g/n, WiMax, LTE, WiFi). It will be apparent that the communication network interface 812 may support many wired and wireless standards.

It will be appreciated that the hardware elements of the computing device 802 are not limited to those depicted in FIG. 8. A computing device 802 may comprise more or less hardware, software and/or firmware components than those depicted (e.g., drivers, operating systems, touch screens, biometric analyzers, or the like). Further, hardware elements may share functionality and still be within various embodiments described herein. In one example, encoding and/or decoding may be performed by the processor 804 and/or a co-processor located on a GPU (i.e., NVidia).

As used in this paper, an engine can include hardware, firmware, or software embodied in a computer-readable medium for execution by the processor. For example, an engine can be a software module or a block of program code that, when run by a processor, performs a particular function, such as ranking content objects. An engine can also include one or more processor or a portion of one or more processors that are dedicated to perform a particular function at a time. A portion of one or more processors can include some portion of hardware, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed.

The engines described in this paper, or the engines through which the systems and devices described in this paper can be implemented locally or can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some implementations, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores may be implemented, for example, as software embodied in a physical computer-readable medium on a specific-purpose machine, in firmware, in hardware, in a combination thereof, or in an applicable known or convenient device or system. Datastore-associated components, such as database interfaces, may be considered "part of" a datastore, part of some other system component, or a combination thereof, though the physical location and other characteristics of datastore-associated components is not critical for an understanding of the techniques described in this paper.

Datastores may include data structures. As used in this paper, a data structure is associated with a particular way of storing and organizing data in a computer so that it may be used efficiently within a given context. Data structures are generally based on the ability of a computer to fetch and store data at any place in its memory, specified by an address, a bit string that may be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, may be cloud-based datastores. A cloud based datastore is a datastore that is compatible with cloud-based computing systems and engines.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

A person skilled in the art can further understand that, various exemplary logic blocks, modules, engines, systems, datastores, circuits, and algorithm steps described with reference to the disclosure herein may be implemented as specialized electronic hardware, computer software, or a combination of electronic hardware and computer software. For examples, the engines/modules/units may be implemented by one or more processors to cause the one or more processors to become one or more special purpose processors to executing software instructions stored in the computer-readable storage medium to perform the specialized functions of the engines/modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processors (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A method, comprising:
    selecting, by a server system, an object user;
    obtaining, by the server system, content objects associated with the object user;
    determining, by the server system, a ranking of the content objects;
    determining, by the server system, a rotation value;
    presenting, by the server system, the content objects based on the ranking of the content objects and the rotation value;
    obtaining, by the server system, user feedback associated with the presented content objects, the user feedback comprising one or more user interface inputs, the user feedback obtained at least partially from one or more remote user systems over a communication network;
    determining, by the server system, an empirical content object score for each of the content objects based on the user feedback;
    obtaining, by the server system, behavioral data of an observer user, the observer user being a presentation target of the presented content objects;
    determining, by the server system, a behavioral score for each of at least one content object of the content objects based on the behavioral data;
    determining, by the server system, a composite score for each of the at least one content object of the content objects, each composite score determined based on the empirical score and the behavioral score associated with a corresponding content object;
    updating, by the server system, the ranking of the content objects based on the one or more composite scores; and
    presenting, by the server system, at least one of the content objects to the observer user based on the updated ranking.

2. The method of claim 1, wherein the content objects comprise photographs.

3. The method of claim 1, wherein the content objects are obtained from a remote third-party content object datastore.

4. The method of claim 1, wherein the presenting the content objects based on the ranking of the content objects and the rotation value comprises presenting a first content object at a first rate based on the rotation value and presenting the remaining content objects at a second rate based on the rotation value.

5. The method of claim 4, wherein the first rate equals to one minus the second rate.

6. The method of claim 1, wherein the behavioral data comprises historical user feedback patterns of the observer user.

7. The method of claim 1, wherein the updating the ranking of the content objects based on the composite score is performed in response to an acceptance by the object user of the updated ranking.

8. The method of claim 1, wherein the updating the ranking of the content objects based on the composite score is performed without requiring user input from the object user.

9. A system, comprising:
    one or more processors and memory, the memory storing computer-executable instructions that, when executed, cause the one or more processors to perform a method comprising:
    selecting an object user;
    obtaining content objects associated with the object user;
    determining a ranking of the content objects;
    determining a rotation value;
    presenting the content objects based on the ranking of the content objects and the rotation value;
    obtaining user feedback associated with the presented content objects, the user feedback comprising one or more user interface inputs;
    determining a content object score for each of the content objects based on the user feedback;
    updating the ranking of the content objects based on the one or more content object scores; and
    presenting the content objects based on the updated ranking and the rotation value.

10. The system of claim 9, further comprising computer-executable instructions that, when executed, cause the one or more processors to perform:
    obtaining behavioral data of an observer user, the observer user being a presentation target of the presented content objects;
    determining a behavioral score for each of at least one content object of the content objects based on the behavioral data;
    adjusting the one or more content object score based on the one or more behavioral scores;
    updating the ranking of the content objects based on the adjusted one or more content object scores; and
    presenting at least one of the content objects based on the updated ranking and the rotation value.

11. The system of claim 9, wherein the content objects comprise photographs.

12. The system of claim 9, wherein the presenting the content objects based on the ranking of the content objects and the rotation value comprises presenting a first content object at a first rate based on the rotation value and presenting the remaining content objects at a second rate based on the rotation value.

13. The system of claim 12, wherein the first rate equals to one minus the second rate.

14. The system of claim 9, wherein the content objects are obtained from a remote third-party content object datastore.

15. The system of claim 9, wherein the behavioral data comprises historical user feedback patterns of the observer user.

16. The system of claim 9, further comprising computer-executable instructions that, when executed, cause the one or more processors to perform adjusting the rotation value based on the updated ranking.

17. The system of claim 9, wherein the adjusting the rotation value increases the first rate.

18. A method, comprising:
   selecting, by a server system, an object user;
   obtaining, by the server system, content objects associated with the object user;
   determining, by the server system, a ranking of the content objects;
   determining, by the server system, a rotation value;
   presenting, by the server system, the content objects based on the ranking of the content objects and the rotation value;
   obtaining, by the server system, user feedback associated with the presented content objects, the user feedback comprising one or more user interface inputs, the user feedback obtained at least partially from one or more remote user systems over a communication network;
   determining, by the server system, a content object score for each of the content objects based on the user feedback;
   updating, by the server system, the ranking of the content objects based on the one or more content object scores; and
   presenting, by the server system, the content objects based on the updated ranking and the rotation value.

19. The method of claim 18, further comprising:
   obtaining, by the server system, behavioral data of an observer user, the observer user being a presentation target of the presented content objects;
   determining, by the server system, a behavioral score for each of at least one content object of the content objects based on the behavioral data;
   adjusting, by the server system, the one or more content object scores based on the one or more behavioral scores;
   updating, by the server system, the ranking of the content objects based on the adjusted one or more content object scores; and
   presenting, by the server system, the content objects based on the updated ranking and the rotation value.

20. The method of claim 19, wherein the behavioral data comprises historical user feedback patterns of the observer user.

21. The method of claim 18, wherein the content objects are obtained from a remote third-party content object storage system.

22. The method of claim 18, wherein the presenting the content objects based on the ranking of the content objects and the rotation value comprises presenting a first content object at a first rate based on the rotation value and presenting the remaining content objects at a second rate based on the rotation value.

23. A method, comprising:
   obtaining, by a server system, behavioral data of an observer user, the observer user being associated with one or more remote user systems in communication with the server system over a communication network;
   associating, by the server system, one or more tags with the observer user based on the behavioral data, wherein at least one of the one or more tags associated with the observer user are based on a threshold rate the observer user historically performed positive feedback actions with respect to a particular type of content object;
   selecting, by the server system, an object user;
   obtaining, by the server system, one or more content objects associated with the object user;
   determining, by the server system, a behavioral score for each of at least one content object of the one or more content objects based on the behavioral data;
   ranking, by the server system, the one or more content objects based on the one or more behavioral scores; and
   presenting, by the server system, at least a portion of the one or more content objects based on the ranking to the observer user.

24. The method of claim 23, wherein the content objects comprise photographs.

25. The method of claim 23, wherein the content objects are obtained from a remote third-party content object datastore.

26. The method of claim 23, wherein the object user is selected based on the one or more tags associated with the observer user and a location of the object user relative to the observer user.

27. The method of claim 23, wherein the presenting at least a portion of the one or more content objects based on the ranking comprises presenting the at least a portion of the one or more content objects based on the ranking and a rotation value.

28. The method of claim 27, wherein the presenting at least a portion of the one or more content objects based on the ranking and a rotation value comprises presenting a content object at a first rate based on the rotation value and the remaining content objects of the one or more content objects at a second rate based on the rotation value.

29. The method of claim 23, wherein the behavioral data comprises historical user feedback patterns of the observer user.

* * * * *